(12) United States Patent
Noble et al.

(10) Patent No.: US 10,935,034 B2
(45) Date of Patent: Mar. 2, 2021

(54) FAN

(71) Applicant: Phansee Company, LLC, Charlotte, NC (US)

(72) Inventors: Philip Emanuel Noble, Charlotte, NC (US); Christopher Patrick Noble, Raleigh, NC (US)

(73) Assignee: PHANSEE COMPANY, LLC, Charlotte, NC (US)

( * ) Notice: Subject to any disclaimer, the term of this patent is extended or adjusted under 35 U.S.C. 154(b) by 116 days.

(21) Appl. No.: 16/238,022

(22) Filed: Jan. 2, 2019

(65) Prior Publication Data

US 2019/0203728 A1     Jul. 4, 2019

Related U.S. Application Data

(60) Provisional application No. 62/612,805, filed on Jan. 2, 2018.

(51) Int. Cl.
| | |
|---|---|
| *B64C 11/30* | (2006.01) |
| *F03D 7/02* | (2006.01) |
| *F04D 25/08* | (2006.01) |
| *F04D 29/64* | (2006.01) |
| *F04D 29/00* | (2006.01) |
| *F04D 29/60* | (2006.01) |

(Continued)

(52) U.S. Cl.
CPC ............ *F04D 25/088* (2013.01); *B64C 11/16* (2013.01); *B64C 11/30* (2013.01); *F03D 7/02* (2013.01); *F03D 7/0224* (2013.01); *F04D 27/00* (2013.01); *F04D 29/002* (2013.01); *F04D 29/34* (2013.01); *F04D 29/362* (2013.01); *F04D 29/601* (2013.01); *F04D 29/646* (2013.01); *F21V 33/0096* (2013.01); *F24F 2221/14* (2013.01)

(58) Field of Classification Search
CPC ...... F04D 27/00; F04D 29/002; F04D 29/088; F04D 29/34; F04D 29/362; F04D 29/601; F04D 29/646; B64C 11/16; B64C 11/30; F03D 7/0224; F24F 2221/14; F21V 33/0096
See application file for complete search history.

(56) References Cited

U.S. PATENT DOCUMENTS

| | | | |
|---|---|---|---|
| 1,815,074 | A | 11/1929 | Schaefer |
| 2,592,315 | A | 9/1948 | Mosley |

(Continued)

FOREIGN PATENT DOCUMENTS

| | | |
|---|---|---|
| CN | 201836082 | 5/2011 |
| CN | 202789656 | 3/2013 |

(Continued)

*Primary Examiner* — J. Todd Newton
*Assistant Examiner* — Andrew J Marien
(74) *Attorney, Agent, or Firm* — Trego, Hines & Ladenheim, PLLC; Brandon Trego; Jonathan Hines

(57) ABSTRACT

A fan is disclosed. The fan includes a base mountable to a ceiling; a base motor contained in the base; a multi-section shaft operably connected to the base motor and moveable between a collapsed position and an extended position; and a fan assembly connected to the multi-section shaft and including a fan motor and at least one fan blade operably connected to the fan motor, wherein in response to a signal, the base motor raises or lowers the fan assembly by moving the multi-section shaft between the collapsed position and the extended position.

13 Claims, 3 Drawing Sheets

(51) Int. Cl.
*F04D 29/34* (2006.01)
*F04D 27/00* (2006.01)
*F04D 29/36* (2006.01)
*B64C 11/16* (2006.01)
*F21V 33/00* (2006.01)

(56) References Cited

U.S. PATENT DOCUMENTS

| | | | |
|---|---|---|---|
| 5,273,402 A | 12/1993 | Maury | |
| 6,443,702 B1 * | 9/2002 | Ross | F04D 25/088 |
| | | | 248/333 |
| 6,644,928 B1 | 11/2003 | Tang | |
| 7,726,945 B2 | 6/2010 | Grant et al. | |
| 8,348,215 B1 * | 1/2013 | Smith | F04D 25/088 |
| | | | 242/390.8 |
| 2004/0253104 A1 * | 12/2004 | Liu | F04D 25/088 |
| | | | 416/48 |
| 2007/0134093 A1 * | 6/2007 | Weiler | F21V 33/0096 |
| | | | 416/60 |
| 2008/0037264 A1 * | 2/2008 | Bennett | F04D 25/088 |
| | | | 362/386 |
| 2008/0138205 A1 * | 6/2008 | Cartwright | F04D 25/088 |
| | | | 416/210 R |
| 2008/0286105 A1 * | 11/2008 | Gajewski | F04D 25/088 |
| | | | 416/155 |

FOREIGN PATENT DOCUMENTS

| | | |
|---|---|---|
| CN | 202946420 | 5/2013 |
| CN | 203702605 | 7/2014 |
| CN | 204984980 | 1/2016 |

* cited by examiner

FAN

BACKGROUND OF THE INVENTION

This invention relates generally to a fan, and more particularly to a ceiling fan designed to allow the fan to be cleaned easily.

Ceiling fans have become standard fixtures in all types of buildings to help circulate air for cooling in the summer and heating in the winter. For example, ceiling fans are often installed in the bedrooms of homes to help circulate air while people sleep at night and the heating and ventilating system is only running intermittently. Likewise, fans are often installed in large buildings to help cool the buildings during the hot summer months.

One of the problems with ceiling fans is that they can often times be difficult to clean due to the height of the ceiling that the fan is mounted to. For example, in some homes fans may be mounted to ceilings with a height of twenty feet. For commercial buildings, the ceilings can be much higher. Thus, cleaning the fan often times results in the need for large ladders and/or extendable poles with cleaning attachments attached thereto.

Accordingly, there is a need for a fan that allows a user to clean the fan without the need for ladders and poles.

BRIEF SUMMARY OF THE INVENTION

This need is addressed by the present invention, which provides a fan capable of being lowered to a cleaning height and that allows a user to rotate the blades so that the user can adequately clean an upper side of the blade.

According to one aspect of the invention, a fan includes a base mountable to a ceiling; a base motor contained in the base; a multi-section shaft operably connected to the base motor and moveable between a collapsed position and an extended position; and a fan assembly connected to the multi-section shaft and including a fan motor and at least one fan blade operably connected to the fan motor, wherein in response to a signal, the base motor raises or lowers the fan assembly by moving the multi-section shaft between the collapsed position and the extended position.

According to another aspect of the invention, a fan includes a base mountable to a ceiling; a base motor contained in the base, the base motor having a motor shaft and a pulley connected to the motor shaft, wherein activation of the motor causes the shaft and pulley to rotate; a multi-section shaft moveable between a collapsed position and an extended position, the multi-section shaft being connected to the pulley of the base motor such that rotation of the pulley causes the multi-section shaft to move between the collapsed position and the extended position; and a fan assembly connected to the multi-section shaft and including a fan motor, at least one fan blade operably connected to the fan motor for rotation, and a pitch change mechanism operably connected to the at least one fan blade to change a pitch of the at least one fan blade, wherein activation of the fan motor causes the at least one fan blade to rotate around a central axis of the multi-section shaft and activation of the pitch change mechanism causes the at least one fan blade to rotate about a central axis of the at least one fan blade to change its pitch.

According to another aspect of the invention, a ceiling fan includes a base mountable to a ceiling; a base motor contained in the base, the base motor having a motor shaft and a pulley connected to the motor shaft, wherein activation of the motor causes the shaft and pulley to rotate; a multi-section shaft moveable between a collapsed position and an extended position, the multi-section shaft being connected to the pulley of the base motor such that rotation of the pulley causes the multi-section shaft to move between the collapsed position and the extended position; and a fan assembly connected to the multi-section shaft and including a fan motor, a blade hub operably connected to the fan motor for rotation about a central axis of the multi-section shaft, a plurality of fan blades operably connected to the fan blade hub, and a pitch change mechanism operably connected to the plurality of fan blades to change a pitch of the plurality of fan blades, the pitch change mechanism including a plunger engaged with each of the plurality of fan blades and configured for movement along a length of the multi-section shaft, wherein movement of the plunger causes each of the plurality of fan blades to rotate and change pitch.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
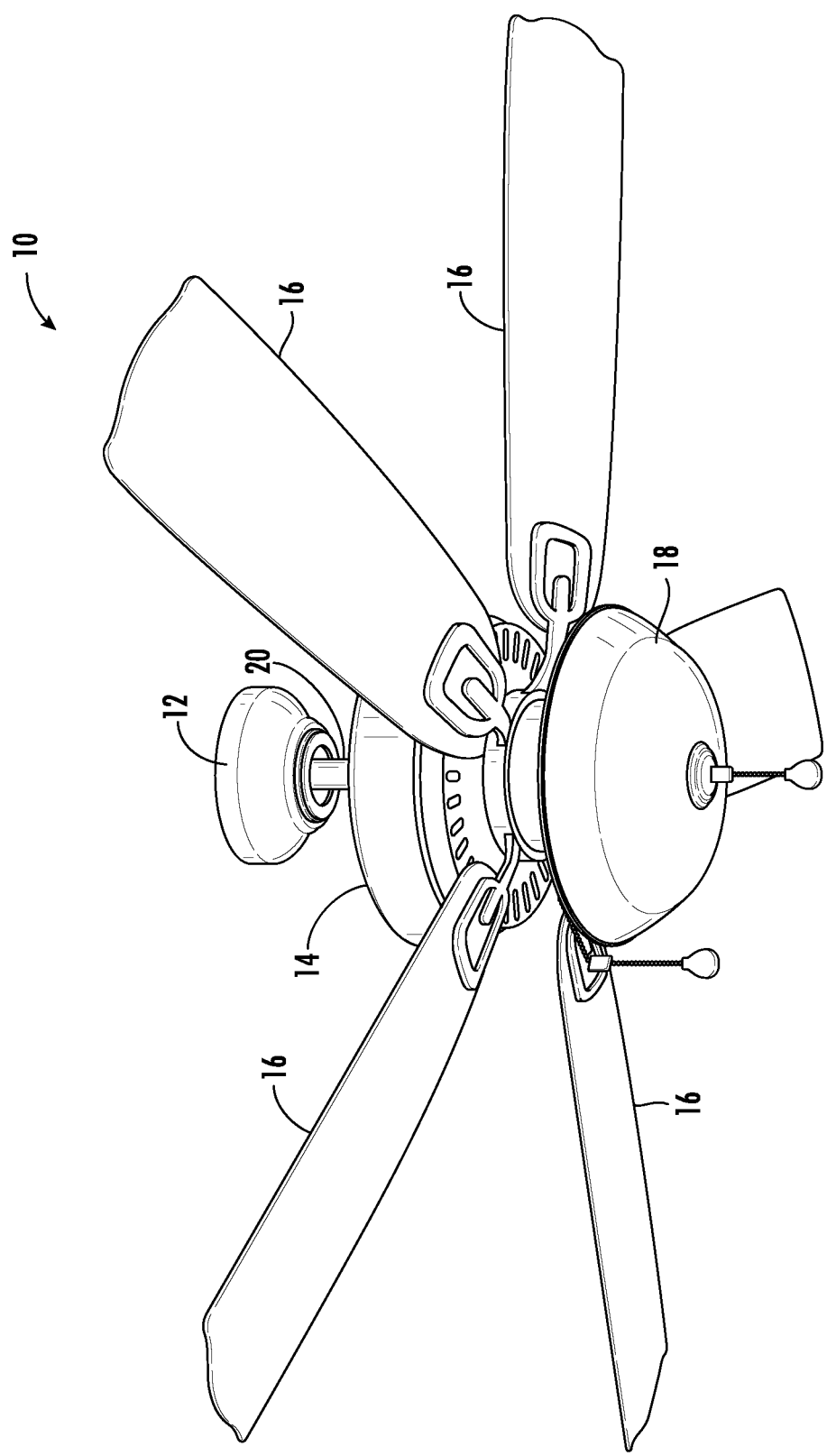
FIG. 1 shows a prior art fan.

Referring to the drawings wherein identical reference numerals denote the same elements throughout the various views, FIG. 1 illustrates a prior art fan 10 having a base 12 to mount the fan to a ceiling, a fan motor 14, a plurality of fan blades 16 connected to the motor 14 and configured for rotation, and a light 18. The fan 10 may also include an extension rod 20 to space the fan blades 16 from the ceiling. It should be understood that the above description is the general description for most ceiling fans currently available and that the invention described below with respect to FIGS. 2 and 3 also includes many of the same pieces and/or parts.

Figure 2:
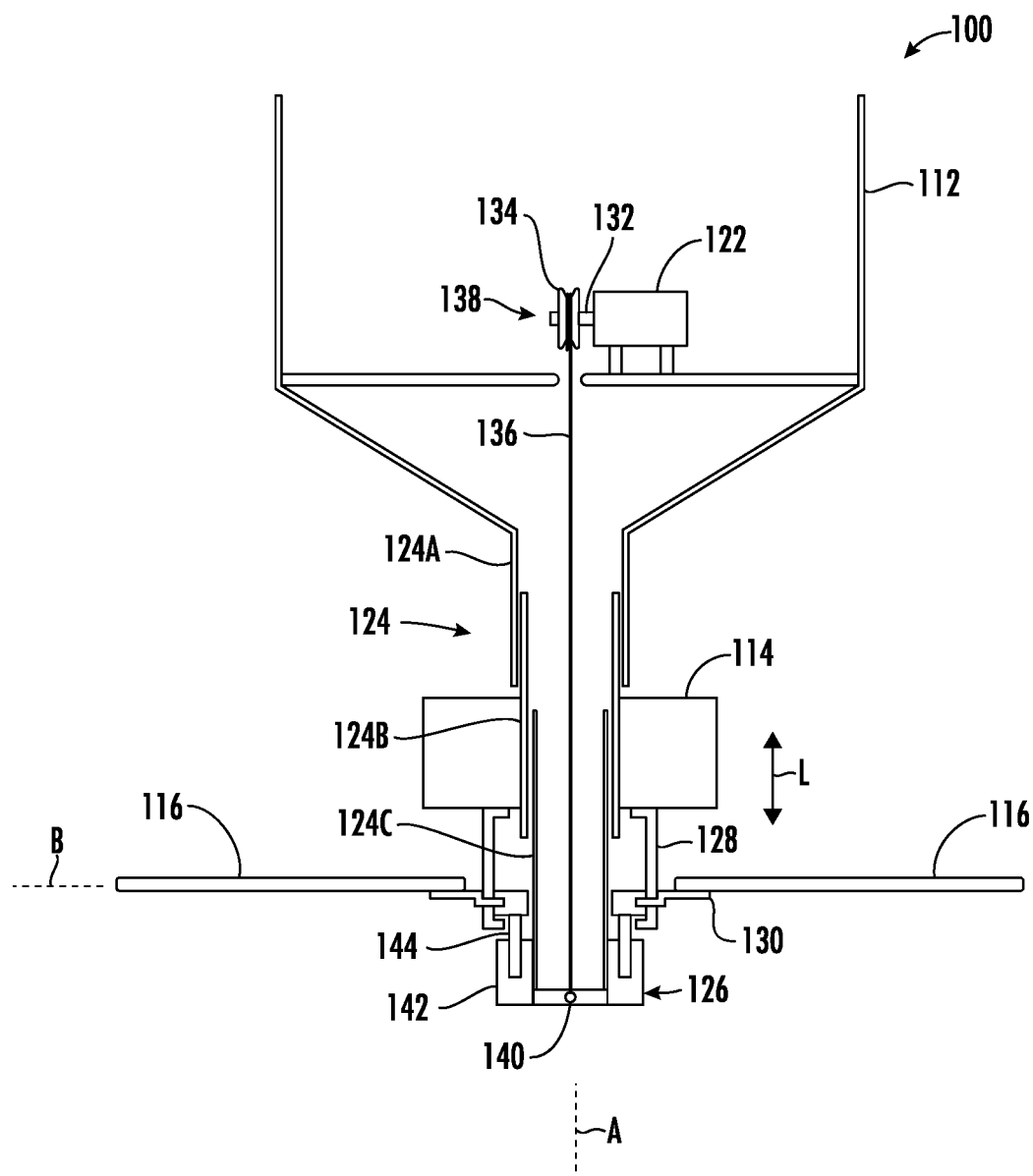
FIG. 2 is a cross-sectional schematic of a fan according to the present invention.
Figure 3:
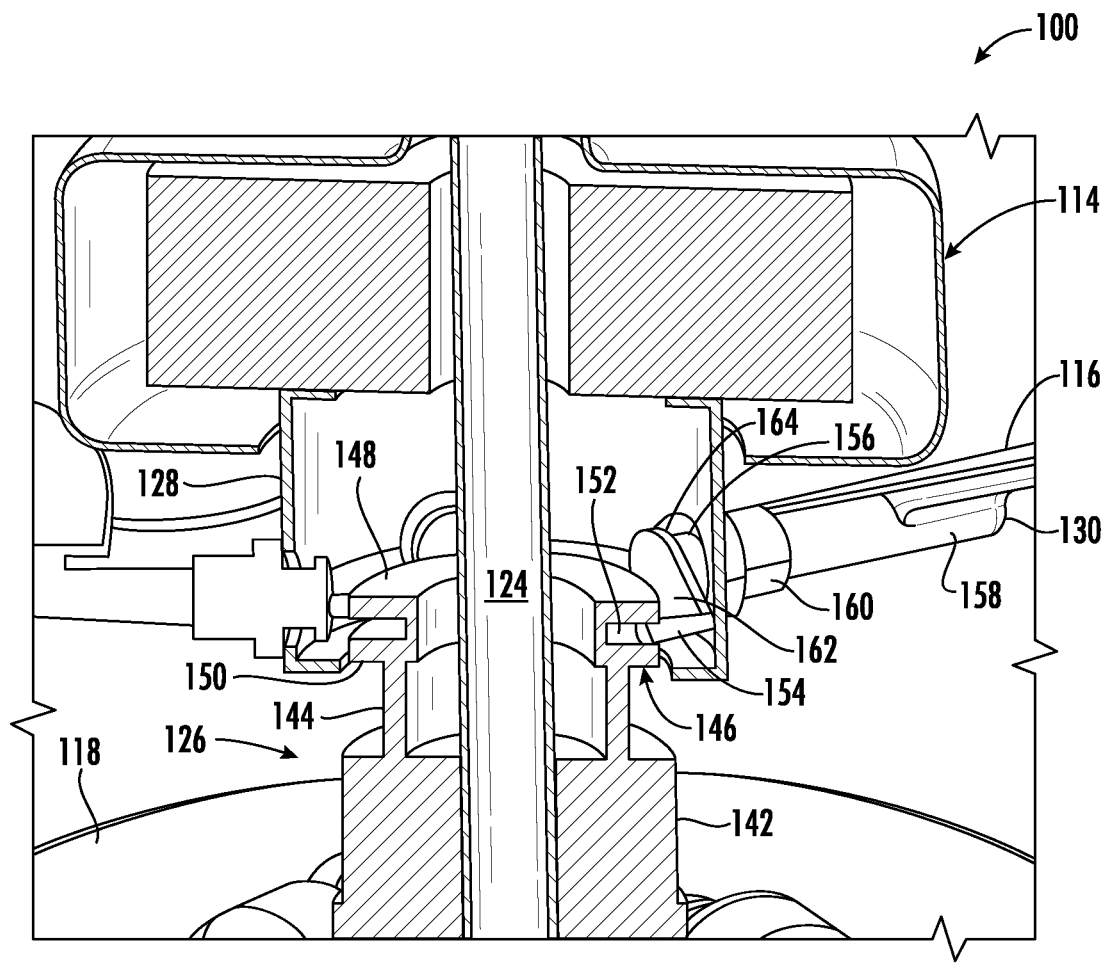
FIG. 3 is a cross-sectional schematic of the fan of the present invention.

Referring now to FIGS. 2 and 3, like fan 10, fan 100 includes a base 112, a fan motor 114, fan blades 116, and a light 118. It should be appreciated that the light 118 is an optional feature and the fan 100 may be used without the light 118. Unlike fan 10, fan 100 includes an electric base motor 122 contained in the base 112, an expandable or extendable multi-section shaft 124, a pitch change mechanism 126, a blade hub 128, and a blade mount 130 for each fan blade 116.

The electric motor 122 is mounted within the base 112 and includes a rotatable shaft 132 connected to the electric motor 122 for rotation and a pulley 134 connected to the shaft 132. A cable 136 is connected to the pulley 134 at a first end 138 and to the multi-section shaft 124 at a second end 140. The cable 136 extends along an interior of the multi-section shaft 124 and is used to raise and lower the motor 114 and fan blades 116. The multi-section shaft 124 includes multiple sections 124A, 124B, and 124C that allow the shaft 124 to extend and collapse. It should be understood that while only three sections are shown, any desired number of sections may be used to increase or shorten the length of travel. This configuration allows a user to lower the fan 100 to a cleaning position and then raise it back up to an operating position.

The pitch change mechanism 126 is positioned along the shaft 124 below the fan blades 116 and includes a solenoid 142 with an electromagnet and a plunger 144 connected thereto. At a first end of the plunger 144, a bearing 146 is formed having an upper ring 148 and a lower ring 150 creating a slot 152 therebetween suitable for receiving a pin 154 of the blade mount 130 therein.

As illustrated, blade mount 130 is connected to a fan blade 116 and extends through an aperture 156 having a bearing surface 164 positioned in the blade hub 128. The blade mount 130 includes fan mount portion 158, a shaft portion 160, and a cam 162 having the pin 154 connected thereto. As illustrated, the pin 154 extends into slot 152. The blade hub 128 may be formed as a single part or as a multi-part hub and is operably connected to the fan motor 114 for rotation; thus, rotation of the blade hub 128 causes the fan blades 116 to rotate about a central axis "A" of the multi-section shaft 124.

In operation, a user can activate electric motor 122 using a remote control or wall switch to lower the fan 100 when cleaning is desired. The remote control may be a user's cellphone via use of an application or a remote provided with the fan 100 and may use short range radio frequency such as Bluetooth, infrared, or any other suitable transmission protocol. Once the fan blades 116 are lowered, the user may clean the fan blades 116.

Additionally, the user may activate the solenoid 142, thereby causing the plunger 144 to move up or down along a length "L" of the multi-section shaft 124. As the plunger 144 moves, the pin 154 moves within the slot 152 causing the cam 162 to rotate and cause the pitch angle of the fan blades 116 to change. In other words, each fan blade 116 rotates about a central axis "B" of the fan blade 116 to change the pitch angle. It should be understood that activation of the solenoid 142 may be accomplished in the same manner as activation of the electric motor 122. Changing the pitch of the fan blades 116 may be done during the cleaning process to allow better cleaning of each fan blade 116 or may be done during operation of the fan 100 to change the amount of air being moved by the fan blades 116.

The foregoing has described a fan. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A fan, comprising:
   a base mountable to a ceiling;
   a base motor contained in the base;
   a multi-section shaft operably connected to the base motor and moveable between a collapsed position and an extended position; and
   a fan assembly connected to the multi-section shaft and including a fan motor, at least one fan blade operably connected to the fan motor, and at least one blade mount connected to the at least one fan blade, the at least one blade mount having a cam with a pin connected thereto, wherein in response to a signal, the base motor raises or lowers the fan assembly by moving the multi-section shaft between the collapsed position and the extended position, the fan assembly further including a pitch change mechanism configured to change a pitch of the at least one fan blade, the pitch change mechanism including a solenoid and a plunger, the solenoid being adapted to move the plunger along a length of the multi-section shaft, wherein movement of the plunger actuates the pin to cause the at least one fan blade to rotate about a central axis of the at least one fan blade to change the at least one fan blade's pitch.

2. The fan according to claim 1, further including a pulley connected to a shaft of the base motor, wherein rotation of the shaft of the base motor causes the pulley to rotate.

3. The fan according to claim 2, further including a cable having a first end connected to the pulley and a second end connected to the multi-section shaft, wherein rotation of the pulley causes the cable to move the multi-section shaft between the collapsed position and the extended position, thereby raising or lowering the fan assembly.

4. The fan according to claim 1, wherein the fan assembly further includes a blade hub operably connected to the fan motor and at least one blade mount operably connected to the blade hub, wherein the at least one fan blade is connected to the at least one blade mount.

5. A fan, comprising:
   a base mountable to a ceiling;
   a base motor contained in the base, the base motor having a motor shaft and a pulley connected to the motor shaft, wherein activation of the motor causes the shaft and pulley to rotate;
   a multi-section shaft moveable between a collapsed position and an extended position, the multi-section shaft being connected to the pulley of the base motor such that rotation of the pulley causes the multi-section shaft to move between the collapsed position and the extended position; and
   a fan assembly connected to the multi-section shaft and including a fan motor, at least one fan blade operably connected to the fan motor for rotation, at least one blade mount connected to the at least one fan blade, the at least one blade mount having a fan mount portion for connecting to the at least one fan blade and a cam with a pin connected thereto, the fan assembly further including a pitch change mechanism operably connected to the at least one fan blade to change a pitch of the at least one fan blade, the pitch change mechanism including a solenoid and a plunger, the solenoid being adapted to move the plunger along a length of the multi-section shaft, wherein activation of the fan motor causes the at least one fan blade to rotate around a central axis of the multi-section shaft and movement of the plunger actuates the pin to cause the at least one fan blade to rotate about a central axis of the at least one fan blade to change the at least one fan blade's pitch.

6. The fan according to claim 5, further including a cable interconnecting the pulley and the multi-section shaft, the cable having a first end connected to the pulley and a second end connected to the multi-section shaft.

7. The fan according to claim 6, wherein the cable extends along an interior of the multi-section shaft.

8. The fan according to claim 5, wherein the fan assembly further includes a blade hub operably connected to the fan motor and at least one blade mount operably connected to the blade hub, wherein the at least one fan blade is connected to the at least one blade mount.

9. A ceiling fan, comprising:
a base mountable to a ceiling;
a base motor contained in the base, the base motor having a motor shaft and a pulley connected to the motor shaft, wherein activation of the motor causes the shaft and pulley to rotate;
a multi-section shaft moveable between a collapsed position and an extended position, the multi-section shaft being connected to the pulley of the base motor such that rotation of the pulley causes the multi-section shaft to move between the collapsed position and the extended position; and
a fan assembly connected to the multi-section shaft and including a fan motor, a blade hub operably connected to the fan motor for rotation about a central axis of the multi-section shaft, a plurality of fan blades operably connected to the fan blade hub, each of the plurality of fan blades include a blade mount, the blade mount operably connecting each of the plurality of fan blades to the blade hub, the blade mount includes a fan mount portion for connecting to the fan blade, a shaft portion connected to the fan mount portion, a cam connected to the shaft portion, and a pin connected to the cam, wherein the shaft portion extends through an aperture in the blade hub to operably connect the fan blade to the blade hub, the fan assembly further including a pitch change mechanism operably connected to the plurality of fan blades to change a pitch of the plurality of fan blades, the pitch change mechanism including a plunger engaged with each of the plurality of fan blades and configured for movement along a length of the multi-section shaft, wherein movement of the plunger causes each of the plurality of fan blades to rotate and change pitch.

10. The ceiling fan according to claim 9, wherein activation of the fan motor causes the fan hub and plurality of fan blades to rotate around the central axis of the multi-section shaft.

11. The ceiling fan according to claim 9, wherein the plunger includes a bearing having an upper ring, a lower ring, and a slot positioned therebetween.

12. The ceiling fan according to claim 11, wherein the pin extends into the slot and actuates the cam when the plunger moves along the multi-section shaft, such that actuation of the cam causes the fan blade to rotate about a central axis of the fan blade, thereby changing the pitch of the fan blade.

13. The ceiling fan according to claim 9, wherein the pitch change mechanism further includes a solenoid configured to move the plunger.

* * * * *